(12) United States Patent
Frink

(10) Patent No.: US 6,327,253 B1
(45) Date of Patent: Dec. 4, 2001

(54) METHOD AND APPARATUS FOR CONTROLLING SWITCHING OF CONNECTIONS AMONG DATA PROCESSING DEVICES

(75) Inventor: Craig R. Frink, Chelmsford, MA (US)

(73) Assignee: Avid Technology, Inc., Tewksbury, MA (US)

( * ) Notice: Subject to any disclaimer, the term of this patent is extended or adjusted under 35 U.S.C. 154(b) by 0 days.

(21) Appl. No.: 09/054,863

(22) Filed: Apr. 3, 1998

(51) Int. Cl.$^7$ .................................................. H04L 12/56
(52) U.S. Cl. ............................................ 370/260; 370/231
(58) Field of Search ..................................... 370/230, 231, 370/235, 236, 360, 412, 413, 414, 389, 395, 396, 397, 369, 372, 375

(56) References Cited

U.S. PATENT DOCUMENTS

| | | |
|---|---|---|
| 4,760,573 | 7/1988 | Calvignac et al. . |
| 5,541,932 | * 7/1996 | Nguyen et al. . |
| 5,600,643 | * 2/1997 | Robrock, II .......................... 370/399 |

(List continued on next page.)

FOREIGN PATENT DOCUMENTS

| | | |
|---|---|---|
| 0 303 751 A1 | 2/1989 | (EP) . |
| 0 535 860 A2 | 4/1993 | (EP) . |
| 0 579 389 A1 | 1/1994 | (EP) . |
| 0 692 764 A1 | 1/1996 | (EP) . |
| 0 700 003 A2 | 3/1996 | (EP) . |
| WO 90/03004 | 3/1990 | (WO) . |
| WO 98/59494 | 12/1998 | (WO) . |

OTHER PUBLICATIONS

Anujan Varma et al., "Using Camp–On to Improve the Performance of a Fibre Channel Switch," pp. 247–255, Proceedings of the Conference on Local Computer Networks, Jan. 1993.

Terry M. Anderson, et al., "High–Performance Switching with Fibre Channel," pp. 261–264, Intellectual Leverage, San Francisco, Feb. 1992.

Yurdaer N. Doğanata, et al., "Effects of Cascading on the Performance of a Switching Subsystem," pp. 1493–1497, Communication for Global Users, Orlando, FL, Dec. 1992.

*Primary Examiner*—Douglas Olms
*Assistant Examiner*—Ken Vanderpuye
(74) *Attorney, Agent, or Firm*—Peter J. Gordon

(57) ABSTRACT

Multiple data processing devices may be interconnected through a switching mechanism while simultaneously conveying flow control information over the interconnect. Mechanisms are provided to ensure that the flow of data to and from interconnected devices has completed prior to changing the configuration of the switch. The switch may be a circuit switch, such as a crossbar switch, or a packet switch or a memory. The switch may be a separate device or may be part of either an input section or an output section of a data processing device. The configuration of the switch may be defined by command data loaded from a central controller, host computer, or other device connected to the switch, such as a sending device or a receiving device with a full duplex connection to the switch. The loading of a new configuration in the switch may be controlled by command data from a sending device, receiving device, or host computer, or by a controller that is responsive to a boundary signal transmitted over the interconnect. In a packet switch, a packet is directed to an output port specified in an address field in the packet. The packet switch directs both requests for data and the data between processing devices. In a memory switch, data may be written into or read from different areas of a memory by different devices. Through a separate channel, devices communicate about the information stored into and read from the memory. Switching is performed by a device selecting a memory into which data is written or from which data is read.

4 Claims, 8 Drawing Sheets

U.S. PATENT DOCUMENTS

| | | |
|---|---|---|
| 5,640,210 | 6/1997 | Knee et al. . |
| 5,715,247 * | 2/1998 | Nava et al. .......................... 370/360 |
| 5,748,632 * | 5/1998 | Houda et al. ....................... 370/399 |
| 5,838,937 * | 11/1998 | Lee et al. ............................. 395/311 |
| 5,847,779 | 12/1998 | Acampora et al. . |
| 5,991,824 * | 11/1999 | Strand et al. ........................... 710/1 |

* cited by examiner

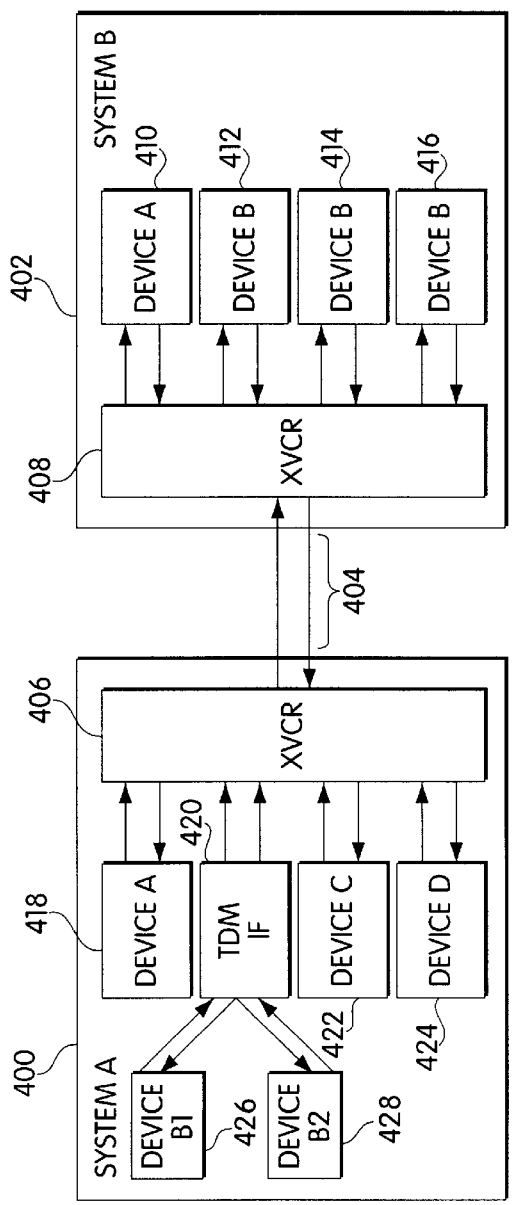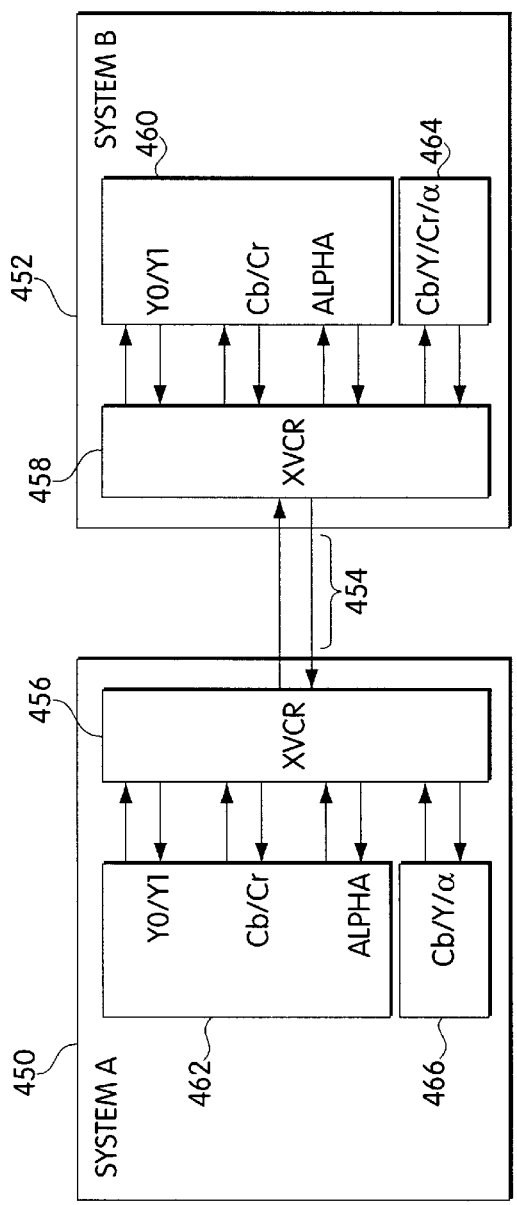

METHOD AND APPARATUS FOR CONTROLLING SWITCHING OF CONNECTIONS AMONG DATA PROCESSING DEVICES

FIELD OF THE INVENTION

The present invention is related to mechanisms for controlling the switching of connections among data processing devices, particularly video processing devices.

BACKGROUND

Analog motion video signals, such as those used in common television sets, video tape recorders and other analog video systems, are temporally continuous and synchronous signals requiring various elements in a video system to be synchronized in order to be used. In other words, analog motion video signals have a predetermined and fixed rate to which all of the elements in the video system are synchronized. Any element in the video system is designed with the assumption that there will be a constant rate for input and output of motion video information.

More recently, it has been possible to store digital motion video data in data files on a computer. There are several methods for playing back such motion video data. One method is called "pushing" or "streaming" of the motion video data. Streaming is based on an assumption that a system can provide an average data flow rate that is the same as the ultimate data flow rate needed to ensure temporally continuous output of analog motion video images to a viewer. Sufficient buffering is used to account for expected latencies in data transfer between elements. In some cases, both the temporal and spatial resolution of the motion video information may need to be reduced. Such systems typically are designed with the assumption that transfer of audio and video data from a source through several processing elements to its ultimate destination can neither be delayed nor stopped.

When a general purpose digital computer is used to process motion video information, a constant rate of flow of data generally cannot be maintained. There may be variations in data flow rates due to various latencies in the computer system due to, for example, disk or memory read latency, interrupts from other processing elements in the computer, etc. In addition, in some systems, such as editing systems, the ability to stop and restart playback is desirable. In order to overcome such problems, one method which has been used is to provide sufficient buffering in combination with an ability for data transfer to be stalled, such as shown in U.S. Pat. No. 5,045,940 (Peters, et al.) which is hereby incorporated by reference. These principles are used in a computer network as described in published European Patent Application No. 0674414A2. An extension of this combination to special effects processing is disclosed in PCT Publications WO94/24815 and WO95/26100 which are incorporated by reference. In this system, a data decompressor outputs data into a first buffer, from which it is transferred to a second buffer associated with a special effects processor. The first buffer indicates whether valid data is available. In addition, the special effects processor indicates to a controller associated with the decompressor whether it can receive data based on memory in the second buffer.

One drawback of these systems is that they use a significant amount of buffering to accommodate for delays in data transfer between elements. They also are designed for use with a single predetermined format of media. Such video processing devices also generally are designed to provide a single output stream based on a combination of inputs. In order to provide connectivity among multiple devices, such interconnections generally are provided statically by a computer network or video switcher. Such mechanisms generally do not provide a way to control data flow through the switch for multiple dynamically configured connections.

SUMMARY

Multiple data processing devices may be interconnected through a switching mechanism while simultaneously conveying flow control information over the interconnect. Mechanisms are provided to ensure that the flow of data to and from interconnected devices has completed prior to changing the configuration of the switch. The switch may be a circuit switch, such as a crossbar switch, or a packet switch or a memory. The switch may be a separate device or may be part of either an input section or an output section of a data processing device. The configuration of the switch may be defined by command data loaded from a central controller, host computer, or other device connected to the switch, such as a sending device or a receiving device with a full duplex connection to the switch. The loading of a new configuration in the switch may be controlled by command data from a sending device, receiving device, or host computer, or by a controller that is responsive to a boundary signal transmitted over the interconnect. In a packet switch, a packet is directed to an output port specified in an address field in the packet. The packet switch directs both requests for data and the data between processing devices. In a memory switch, data may be written into or read from different areas of a memory by different devices. Through a separate channel, devices communicate about the information stored into and read from the memory. Switching is performed by a device selecting a memory into which data is written or from which data is read.

Accordingly, in one aspect, a switching system dynamically configures connections between devices which control flow of data between the devices. The switching system includes an input for receiving data and a plurality of outputs to which data received through the input is directed. A switch directs data from the input to one of the plurality of outputs in response to command data. Flow control information is directed between the devices for controlling the flow of data between connected devices. The switching system ensures that flow of data between connected devices completes prior to changing connections between the devices by the switch.

In another aspect, the switching system has a plurality of inputs for receiving data and an output to which data received through the inputs is directed. A switch directs data from one of the inputs to the output in response to command data. Flow control information is directed between the devices for controlling the flow of data between connected devices. The switching system ensures that flow of data between interconnected devices completes prior to changing connections between the devices by the switch.

In one embodiment, the switch is a circuit switch. The flow control information between the devices includes a request signal from a first device, which is directed to a second device. A valid data signal may be received from the second device, which is directed to the first device. Connections between the devices are changed by the switch in response to a signal from the first device or the second device.

In another embodiment, the switch is a packet switch. Flow control information is directed between the devices by conveying a request packet from a first device to a second device for indicating a channel and an amount of data requested from the second device, and by conveying a data packet from the second device to the first device indicating an amount of valid data. Connections among the devices are established by conveying data packets with an indication of a destination device and by routing data packets among devices according to the indication of the destination device in the packet.

In another embodiment, the switch is a memory device. Flow control information is directed between the devices by using a first flow control channel connected between a first device and a second device, and a second flow control channel connected between the first device and a third device.

It should be understood that other aspects of the invention include processes for controlling switching such as performed by the switching system, and the various embodiments of the process. Systems of interconnected devices using switching systems in the various embodiments also are aspects of the invention. Another aspect of the invention is a video processing system in which different video processing devices are interconnected using a switching system to provide routing of video data for different and dynamically configurable video processing functions.

BRIEF DESCRIPTION OF THE DRAWING

In the drawing,

FIGS. 5A–5C are block diagrams of example packet transceivers used in a switching configuration;

DETAILED DESCRIPTION

Figure 1:
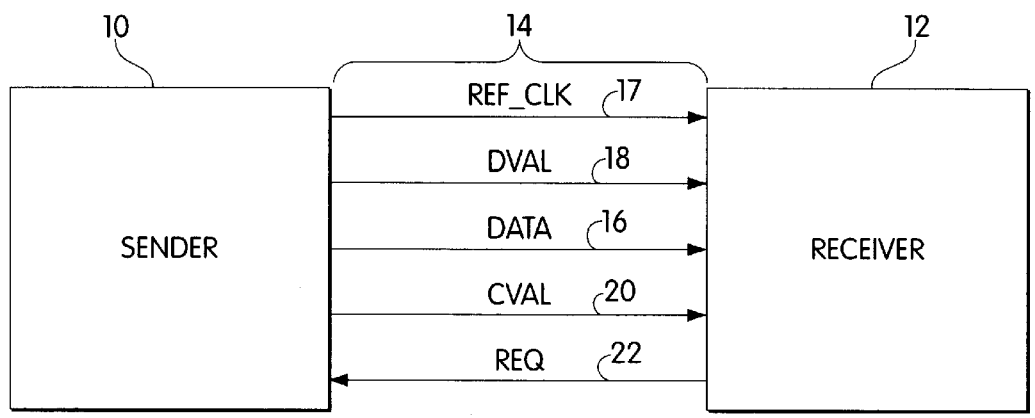
FIG. 1 is a schematic diagram illustrating data transferred between a sending device and a receiving device over an interconnect.

An interconnect for connecting two data processing devices is shown in FIG. 1. The diagram in FIG. 1 is general and illustrates the kind of data that is transferred between a sending device 10 and receiving device 12 over an interconnect 14. The kind of information includes data 16, a valid data signal (DVAL) 18, an optional valid command signal (DVAL) 20 and a request signal (REQ) 22. The sending device also may transmit a reference clock (REF_CLK) to the receiving device. The data may be data to be processed or command data and also may include a boundary signal which is a delimiter of the data being transferred, such as the end of an image for video data. Various implementations for the interconnect 14 and a protocol for controlling data flow over the interconnect are described in: U.S. patent application Ser. No. 08/879,981; U.S. Patent Application entitled "Apparatus and Method for Controlling Transfer of Data Between and Processing of Data by Interconnected Data Processing Elements," filed Apr. 3, 1998, by Craig R. Frink et al.; and U.S. Patent Application entitled "A Packet Protocol for Encoding and Decoding Video Data and Data Flow Signals and Devices for Implementing the Packet Protocol," filed Apr. 3, 1998 by Craig R. Frink, et al.; and U.S. Patent Application entitled "Method and Apparatus for Controlling Data Flow Between Devices Connected by a Memory," filed Apr. 3, 1998 by Craig R. Frink, which are hereby incorporated by reference.

Figure 2:
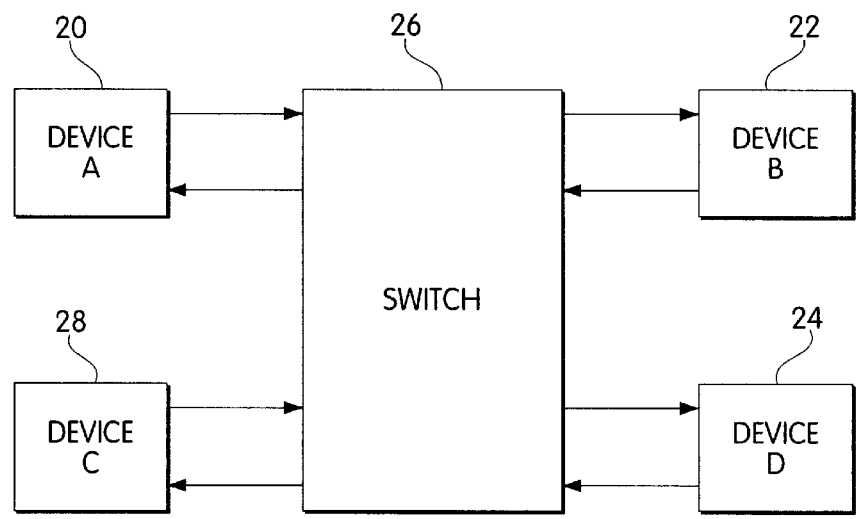
FIG. 2 is a block diagram of a system using a switch to connect multiple sender and receiver devices.

Several devices having such an interconnect may be connected in the manner shown in FIG. 2. FIG. 2 shows a device 20 connected to devices 22 and 24 through a switch 26. A device 28 also is connected to devices 22 and 24 through switch 28. The switch may be a circuit switch, a packet switch or a memory. A switch may be part of either an input section or an output section of a data processing device. In the different methods for configuring the different kinds of switches, mechanisms are provided to ensure that the flow of data to and from interconnected devices completes prior to changing the switching configuration provided by the switch. As a result, multiple processing devices may be interconnected through a switch while simultaneously conveying flow control information through the switch. Processing devices also may be provided with multiple input ports and/or multiple output ports to which data may be directed under dynamic control. A connection between an output port and an input port may be selected within the device using a switch.

A circuit switch may have data buffering and may provide flow control signals on each port, or may be a simple crossbar switch. Using a circuit switch such as a crossbar switch, the pathways between connected devices are independent and separate, i.e., not shared, so that the behavior of one device does not directly affect the behavior of another device on the interconnect. Such a switch 26 can transport constant flow or a controlled flow data. Any device connected to the switch 26 is able to connect to any other device attached to the switch.

Figure 3:
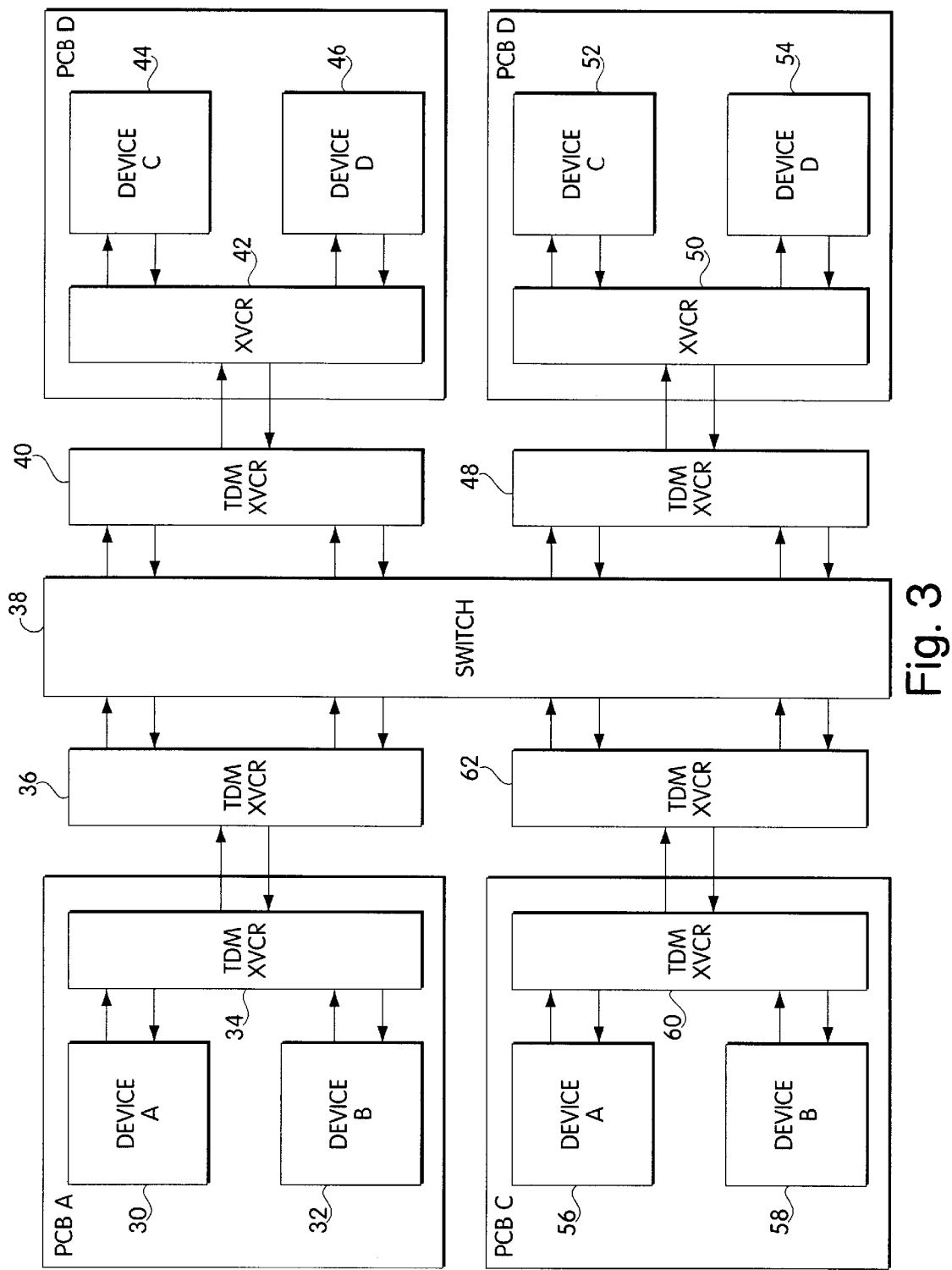
FIG. 3 is a block diagram of a system in which multiple devices are connected through time division multiplexing and a switch.

FIG. 3 illustrates the use of a switch to connect devices which are connected by a time division multiplexed interconnect. Such time division multiplexing is described in more detail in U.S. Patent Application entitled "Apparatus and Method for Controlling Transfer of Data Between and Processing of Data by Interconnected Data Processing Elements," filed Apr. 3, 1998, by Craig R. Frink et al. In this system, two devices 30 and 32 are connected to a time division multiplexing (TDM) transceiver 34 by a single interconnect. The TDM transceiver 34 is connected over a time division multiplexed connection to another TDM transceiver 36. The TDM transceiver 36 demultiplexes the data from devices from 30 and 32 and provides a single stream connection for each device through a switch 38. The switch 38 in turn directs the data streams to another TDM transceiver 40. TDM transceiver 40 multiplexes its input streams from the crossbar switch 38 onto a time division multiplexed interconnect to another TDM transceiver 42 which demultiplexes the data to provide the data to devices 44 and 46. Transceiver 48 operates in a manner similar to transceiver 40. Transceiver 50 similarly connects devices 52 and 54 to the transceiver 48. Devices 56 and 58 also connect to a transceiver 60 similar to transceiver 34 which is in turn connected to a transceiver 62 in order to connect the data flow from devices 56 and 58 to switch 38. The use of the switch 38 in combination with time division multiplexing thus involves first decomposing the time division multiplexed data stream into individual data streams before directing them through the switch 38. The streams output by the switch are combined in TDM transceivers for transmission to the devices. The switch 38 creates any desired connectivity among devices 30, 32, 56, 58, 44, 46, 52 and 54.

There are several ways to control the configuration of a switch such as switch 26 in FIG. 2 or switch 38 in FIG. 3. The switch configuration may be controlled through a separate port under software control or by devices sending command data in the data transmitted over the interconnect. Both a sender and a receiver of data may have the ability to communicate connection information directly to the switch. Various methods for controlling a circuit-based switch, a packet switch and memory as a switch are described below.

Generally, a switch configuration may be changed either statically or dynamically during system operation if data ordering is maintained. The data ordering is maintained for dynamic configuration of a switch because data flow devices are decoupled from each other in time, and the tasks they execute are allowed to complete at different times, at different rates. A control system for dynamic configuration thus may introduce overhead and reduce data throughput. In general, the switch connection configuration may change after the flow of data to and from previous connections is completed.

One way to control a circuit switch is by including in the switch a double-buffered register or queue of switch configurations which may be loaded by a central controller, host computer, or other device such as either a sending device or a receiving device. A new configuration may be loaded by the switch from the registers or queue at a time specified by a sender, or by a controller or by a receiver.

A field advance counter, described in U.S. patent application Ser. No. 08/879,981, entitled "Apparatus and Method for Controlling Transfer of Data Between and Processing of Data by Interconnected Data Processing Elements," filed on Jun. 20, 1997 by Jeffrey D. Kurtze, et al., which is hereby incorporated by reference, may be used to control loading of a switch configuration in one embodiment. A field advance counter tracks data flow through a device by tracking the boundary signal. The counter is loaded with a value indicating the amount of data for which the configuration is valid. The counter is decremented in response to a boundary signal. The device being controlled by the field advance counter is the switch and possibly other devices in the same context. The command data provided to the switch is its configuration. The switch uses the boundary signal to detect data boundaries at which a reconfiguration of switch parameters may occur. When the last component of data for a connection passes the switch, as indicated by the boundary signal, the switch loads its new connection if the field advance counter is at zero. The field advance counter in the switch tracks the boundary signal at the target device connection port rather than at the input device connection port. Any new field advance counter value is loaded at the same time a new connection is made. A system in which such a switch may be used is described in U.S. Patent Application entitled "A Multi Stream Switch-Based Video Editing Architecture," filed Apr. 3, 1998 by Jeffrey D. Kurtze et al. and U.S. Patent Application entitled "A Multi Stream Video Editing System Using Uncompressed Video Data For Real-Time Rendering Performance and For Non Real-Time Rendering Acceleration," filed Apr. 3, 1998, by Craig R. Frink et al., which are hereby incorporated by reference.

Instead of using a field advance counter to control loading of a switch configuration from a double-buffered register or queue, command data embedded in the data sent by a sender through the switch to a receiver may be used to indicate the end of a connection sequence. This command data is termed herein a "fence." The fence may be defined using a packet encoded through use of the valid command signal and valid data signal in conjunction with the data on the interconnect. Such packet encoding is described in U.S. Patent Applications entitled "Apparatus and Method for Controlling Transfer of Data Between and Processing of Data by Interconnected Data Processing Elements," filed Apr. 3, 1998, by Craig R. Frink et al. and entitled "A Packet Protocol for Encoding and Decoding Video Data and Data Flow Signals and Devices for Implementing the Packet Protocol," filed Apr. 3, 1998, by Craig R. Frink, et al. Using a fence eliminates any field advance counter logic in the switch. In this embodiment, an output port on the switch has a "current connection" indicating an input port to which it is connected, and a next connection in the queue. When the switch detects a fence in an input data stream, the switch is configured according to the next input port specified for the output port of the connection for the data in which the fence was detected.

In order to relax the timing of the switch interface by allowing a connection to be made over several clock cycles, a gap may be introduced in the data flow. For example, the sender may stop sending data over the interconnect for a period of time following the last component of the data, i.e., after the boundary signal is asserted. This period of time may be programmable in a sender. The duration of such a gap may be defined by any latency in controlling the data flow in response to handshake signals between the receiver and sender and any latency through intervening switches between the sender and receiver. In the absence of a gap in the data flow, additional buffering may be used in the switch. The gap in the data flow also permits a phase-lock loop enough time to lock to any reference clock that accompanies the data over the interconnect from one device to the other through a switch after a dynamic switch of a data connection.

In another embodiment, the receiver, rather than the sender, may control the loading a new configuration in the switch from the register or queue. In particular, the receiver in this embodiment has a duplex connection. One connection provides a path for receiving data from the switch. The other connection provides a path for transmitting command data to the switch. The command data may be encoded using the valid command signal, the valid data signal and data in the same manner that a sender encodes a fence sent to the switch. In this embodiment, the receiver may send the command data to the switch, for example, in response to a boundary signal. Although the sender still may have data available, the receiver de-asserts the request signal before changing the switch configuration, forcing the sender to wait until the receiver requests data. In this manner, a receiving device may select from several sender devices and may cause switching to occur at the data boundary as identified by the boundary signal.

Figure 4:
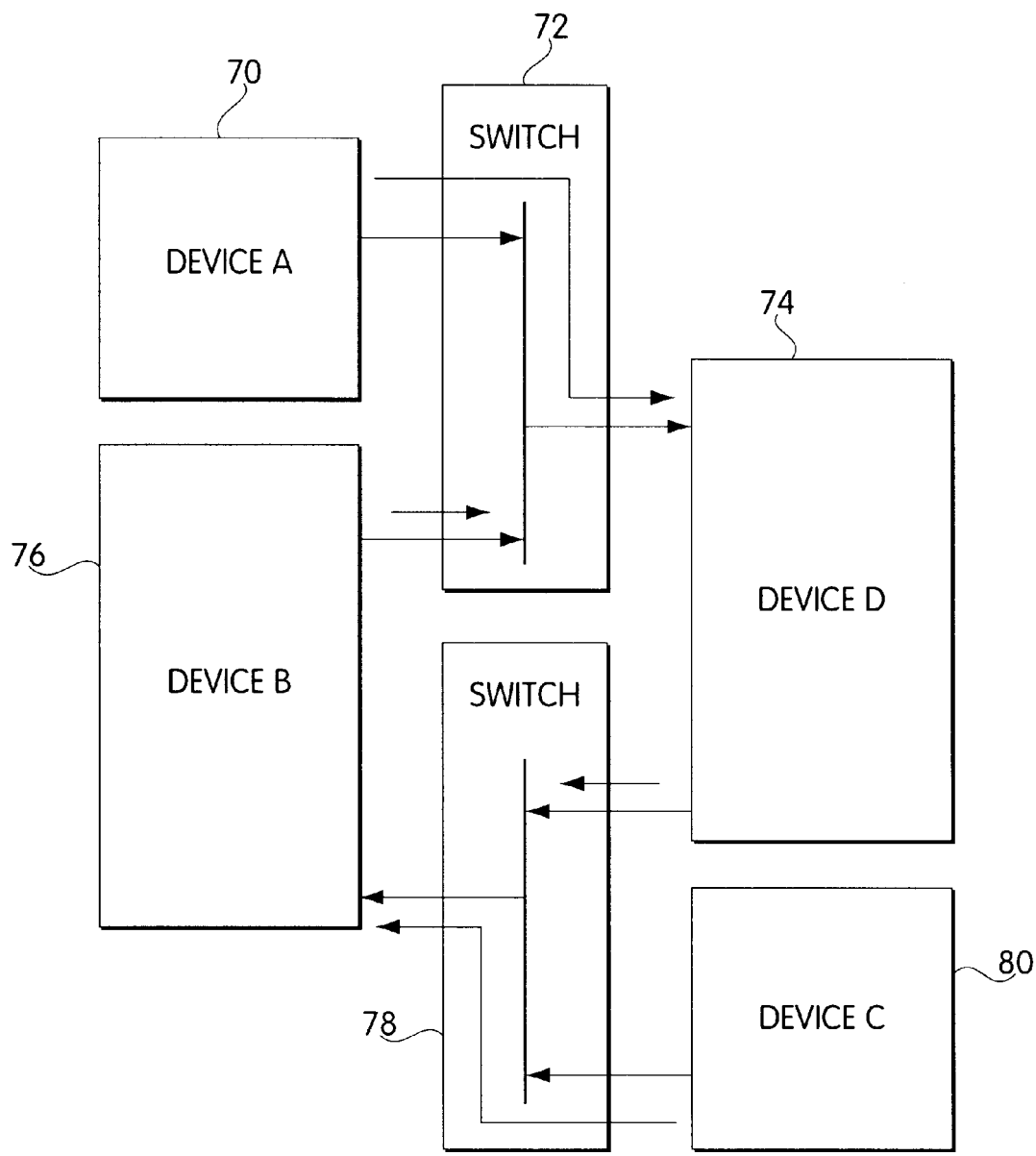
FIG. 4 is a block diagram of an example configuration of devices interconnected through multiple switches.

In some systems in which the sender or receiver controls the establishment of a new configuration at a switch, synchronization or acknowledgment of the connections helps to avoid data loss. For example, referring now to FIG. 4, a system is shown including a device 70 connected to switch 72 to device 74. Device 76 also is connected to device 74 through switch 72, but the switch is not configured to maintain that connection. Device 74 is connected through switch 78 to device 76, but the switch 78 is not configured to allow data flow from device 74 to device 76. Device 80 is presently connected to provide data through switch 78 to device 76. Device 74 may be connected to device 76 after the connection between device 80 and device 76 terminates. Device 76 may be connected to device 74 through switch 72 after the connection to device 70 terminates. Device 74 instructs switch 78 to change the configuration, and device 76 instructs switch 72 to change to the configuration. The switches wait for a fence to be received before establishing the new connection.

In some embodiments, command data may be present on an interconnect which is not flow controlled. In such an embodiment, a sending device, such as device 74 or 76, may attempt to issue command data to a receiver before the switch configuration is established if the configuration is requested by a receiver. In order to avoid this situation, the switch may be configured to signal to a device that the receiver connection is established. A sending device may wait for this signal from the switch before issuing any command data. The switch waits until the end of a current connection, i.e., a fence, before signaling the sender of a new connection. Alternatively, a duplex connection may be provided to the receiver. A device may send command data to the other device until an acknowledgment is received to confirm the establishment of a connection. A switch also may be used in a similar manner to indicate to a receiver using a command data that a new connection has been made.

Another way to control switching between devices is by using a packet switch. A packet switch dynamically routes each packet of data to an output port which is specified in some way by data within the packet. A packet switch through which data flow is controlled by the sender and receiver uses a packet protocol. One kind of packet protocol for this purpose is described in more detail in U.S. Patent Application entitled "A Packet Protocol for Encoding and Decoding Video Data and Data Flow Signals and Devices for Implementing the Packet Protocol," filed Apr. 3, 1998 by Craig R. Frink, et al., which is hereby incorporated by reference.

A packet switch generally receives data that incorporates an indication of a destination device, for example by indicating a network address of the device or an output port of the switch. In the embodiment shown in the last application cited above, the address is defined by a sequence of output ports on a series of interconnected devices. The packet switch sends command, interrupt and data packets from a sending device to a receiving device and sends request packets for controlling the flow of data from a receiving device to a sender device. An example embodiment of a switch, in combination with a transceiver to generate packet data from data interconnects will now be described in connection with FIG. 5.

Figure 5A:
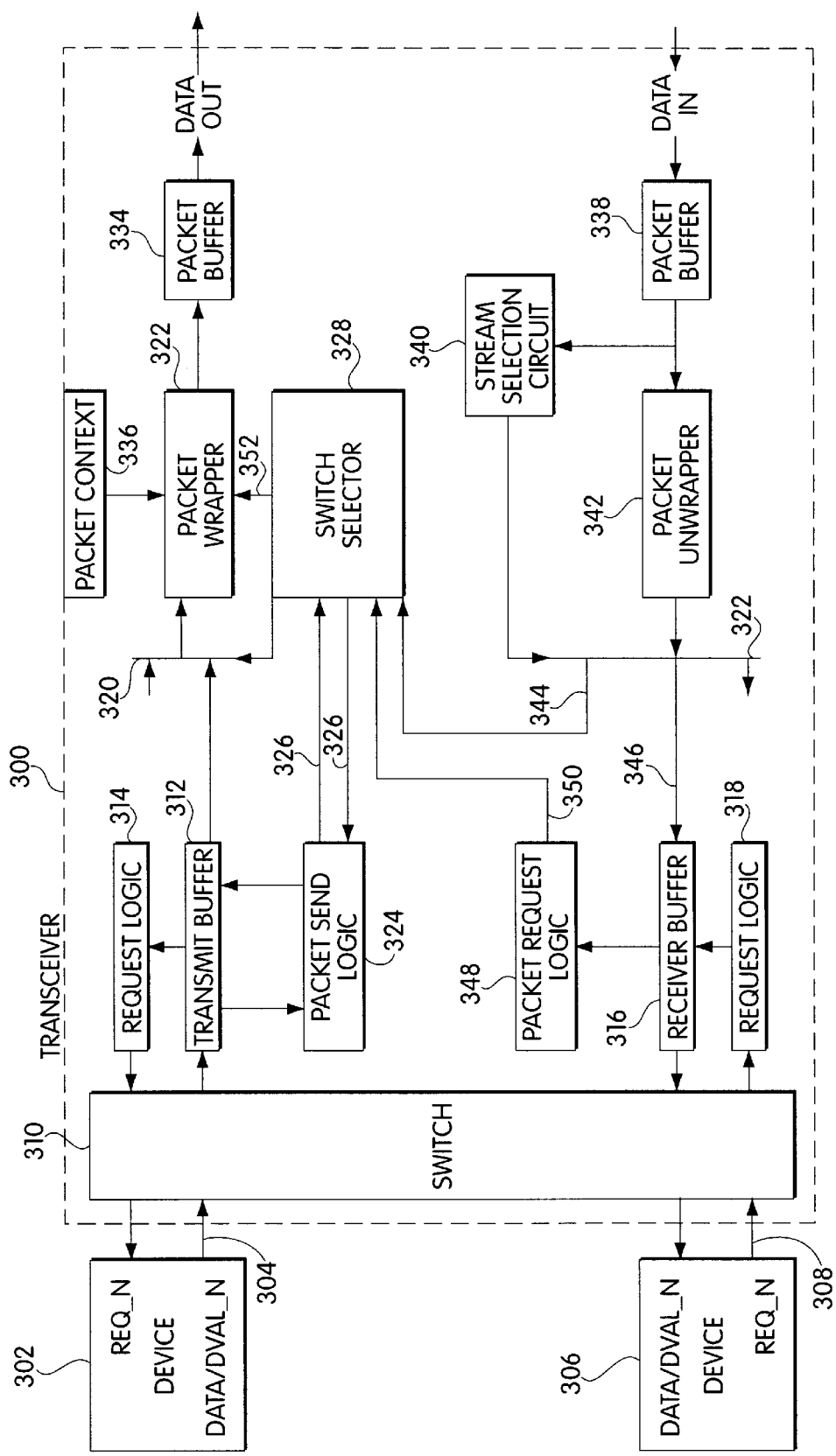

FIG. 5A illustrates a packet transceiver 300 which is connected to receive data from one or more devices 302. The connection at 304 may be direct data link over which data flow is controlled by a protocol such as described in U.S. Patent Application entitled "Apparatus and Method For Controlling Transfer of Data Between and Processing of Data By Interconnected Data Processing Elements," filed Apr. 3, 1998, by Craig R. Frink, et al., which is hereby incorporated by reference. Transceiver 300 also is connected to one or more devices 306 through a similar port 308. Transceiver 300 sends data to devices 306. Ports 304 and 308 are connected through a dynamically configured switch 310, which may be configured using methods described above. Switch 310 may connect devices 302 either to devices 306 or to the transceiver 300. For each port of transceiver 300 that may receive data from a device 302, the transceiver 300 has a transmit buffer 312, which may be implemented as a FIFO. If the FIFO 312 is not full, a signal is generated by request logic 314, which issues a request signal to device 302. Similarly, transceiver 300 may send data to device 306 by sending data from a receive buffer 316, which may be implemented as a FIFO. A request signal from device 306 is processed by request logic 318 to issue a read command to the receive buffer 316. Other similar transmit buffers and receive buffers (not shown) corresponding to other similar devices are connected through respective switches 320 and 322.

The flow of data between devices 306 and 302 and the transceiver 300 is regulated by the state of the FIFOs 312 and 316. The transceiver 300 tries to maintain a constant flow of data between FIFOs 312 and 316 and devices 302 and 306 by issuing packet requests to another device, or by sending data in response to requests from other devices when data is available.

In order to transmit data from device 302 through transceiver 300, when data is available in buffer 312, a packet ready signal is sent to packet send logic 324. Packet send logic 324 provides a data ready signal 326 to switch selector 328. When data for this channel is authorized to be transmitted, the switch selector 328 sets the state of switch 320 and sends a send data signal 330 to the packet send logic 324. In turn, the packet send logic 324 instructs the FIFO 312 to read data which is transmitted to a packet wrapper 332. The packet wrapper forms the data into a packet and supplies it to a buffer 334 which outputs the packet. The packet buffer 334 may be a double buffer to overlap packet transmission with packet assembly. Each port, e.g. 304 and 308, has a unique stream identifier (SID) associated with it. Data and data requests are directed to the ports as identified by the SID. The SID also may be used to identify a packet context which is provided for each stream as indicated at 336. The packet context 336 is used in the construction of packet headers including target addressing, stream identifier, etc.

The transmission of data from a device 302 is performed in response to a request packet received by the transceiver 300. The packet is received in a buffer 338 that also may be implemented as a double buffer. The stream identifier in a packet is used by stream selection circuit 340 to select a device 306 using switch 322. The packet unwrapper 342 transforms the header and data portions of the packet into a request signal 344 or data 346. The request signal 344 is provided to the switch selector 328 in order to create a send data signal 330 to the indicated channel. When receiving data, packet request logic 348 generates a packet request 350 when the FIFO 316 is not full. The packet request signal 350 prompts the switch selector 328 to issue a send packet request 352 to the packet wrapper 332. The transceiver 300 also may be used to generate command packets in response to command data.

The rate at which the data is sent by transceiver 300 also may be controlled in response to a packet rate control value identified in a request for data. The packet rate control value may be provided through request signal 344 to the switch selector 328. The switch selector 328 includes a counter as described above which controls the rate at which packets are output by the packet wrapper 332.

Fig. 5B illustrates an example interconnection of devices using transceivers such as transceiver 300 in FIG. 5A. In this example, system 400 is connected to system 402 through a packet protocol interconnect 404. Transceivers 406 and 408 provide a connection to the interconnect 404 and are implemented as shown in FIG. 5A. System 402 includes devices 410, 412, 414 and 416 which are connected to the transceiver 408 in the same manner that devices 302 and 306 are connected to transceiver 300 in Fig. 5A. Devices 418, 420, 422 and 424 similarly are connected to transceiver 406. Device 420 is a time division multiplexed interface that connects two devices 426 and 428 to the transceiver 406. Data streams in the system may be routed between devices using the transceivers 406 and 408 and even between devices within the same system because transceivers 406 and 408 include a dynamically configured switch 310 (FIG. 5A). In addition to providing switching among devices, this transceiver switch enables multiple stream copies to be created from a single stream of data.

Another example system is shown in FIG. 5C. In Fig. 5C, systems 450 and 452 are interconnected by a packet protocol interface 454. The connection is provided by transceivers 456 and 458 which are implemented using the transceiver shown in FIG. 5A. System 452 includes a first device 460 which uses three data channels connected to the transceiver 458. Such a device may be a high definition televisional (HDTV) device using 4:2:2 video and an alpha channel. A similar device 462 is found in system 450. Device 464 uses one channel and may provide a standard definition television signal (SDTV) defining 4:4:4:4 video and an alpha channel. A similar device 466 is shown in system 450. In this embodiment, the transceiver 456 combines multiple input streams, e.g. from devices 462 and 460 into a single high speed connection 454. The single stream of data from connection 454 is divided into multiple streams to the devices 460, 462, 464 and 466. This capability is useful when transferring data streams that operate at a rate above that of a single port.

In these embodiments, the combination of a FIFO buffer and flow control protocols for each port on the transceiver enables the transceiver to maintain maximum data throughput when connecting devices across a packet protocol interface, e.g., 454, and through the transceiver. The high throughput and efficient interconnect utilization is provided with a flexible routing method.

The packet switch may be provided with buffering at its input and output ports to avoid underrun and overrun conditions. The buffer may be implemented as a first-in/first-out memory. The buffer should be large enough to sustain a target data throughput of the switch where multiple devices contend for the same destination port.

Another kind of switch that may be used is a memory-based switch. Such a switch may be used in circumstances where several devices are interconnected by a memory. One embodiment of such as switch is shown in U.S. Patent Application entitled "Method and Apparatus for Controlling Data Flow Between Devices Connected by Memory," filed Apr. 3, 1998, by Craig R. Frink, which is hereby incorporated by reference.

Figure 6:
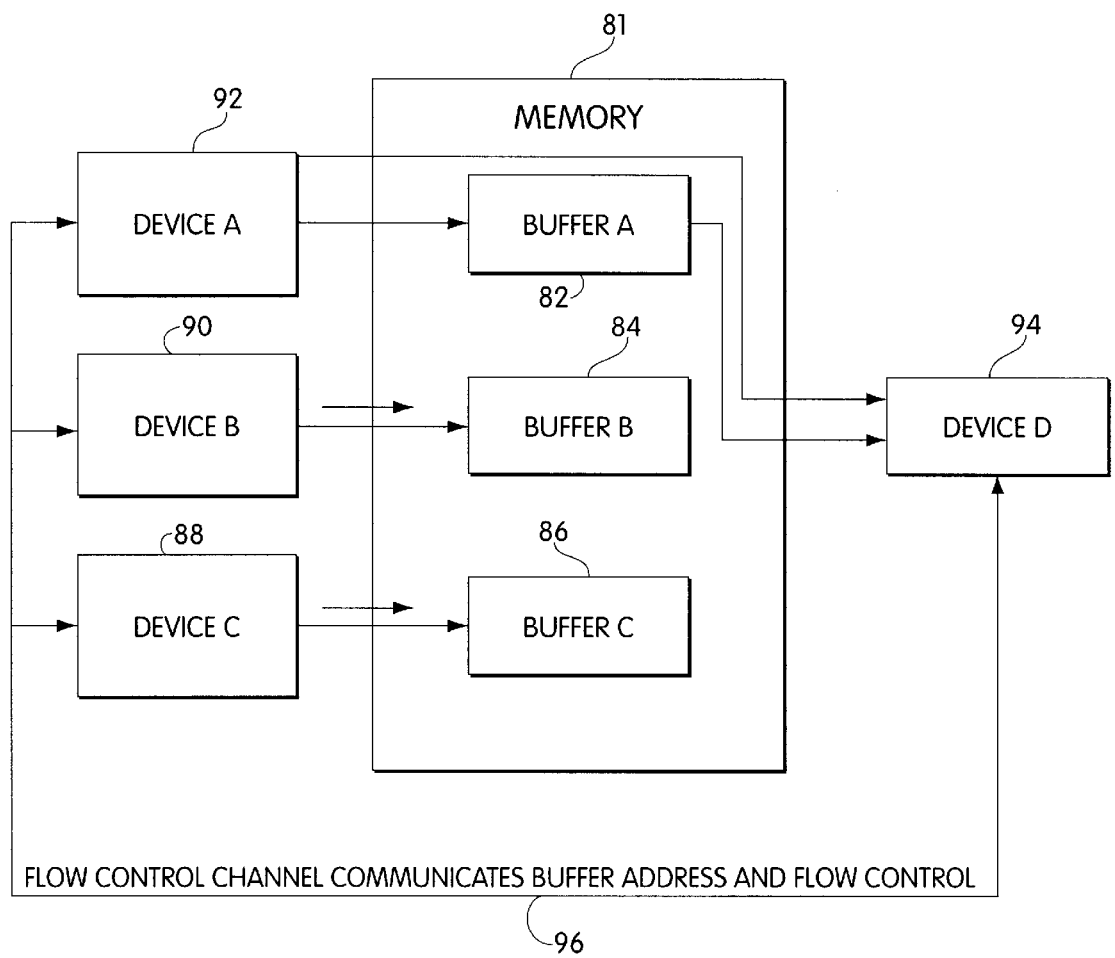
FIG. 6 is a block diagram of one embodiment of a memory switch.

Referring to FIG. 6, a memory 81 has three buffers, 82, 84 and 86. A first sending device 88 sends data to buffer 86. A second sending device 90 sends data to buffer 84. A third sending device 92 sends data to buffer 82. The receiving device 94 may read data from any of the buffers 82, 84 and 86. In this figure, receiving device 94 is shown receiving data from sending device 92 through buffer 83. The sending devices 88, 90 and 92 send flow control information over a flow control channel 96 to the device 94. The receiving device 94 sends flow control information back to any of the sending devices 88, 90 and 92 over control channel 96 according to the buffer from which it reads the data. If the memory 80 is host memory and the devices 88, 90, 92 and 94 are PCI devices, this system uses host memory as a flow controlled switch among the PCI devices. In this embodiment, the data flow passes through the memory. Flow control information is passed through a separate link. The flow control information also may have an associated switch, or flow control information from all senders may be received by each destination.

The control channel also may communicate auxiliary switching information between connected DMA devices. This auxiliary switching information permits remote devices to implement dynamic packet switching through memory. Such auxiliary switching information may include the starting address of the data buffer and memory, the buffer size and configuration, and the source address of the device connection at the destination end. The auxiliary information may include a memory address into which data is to be written or a device address to which data should be routed. The switching information also may be provided by a field advance counter.

Figure 7:
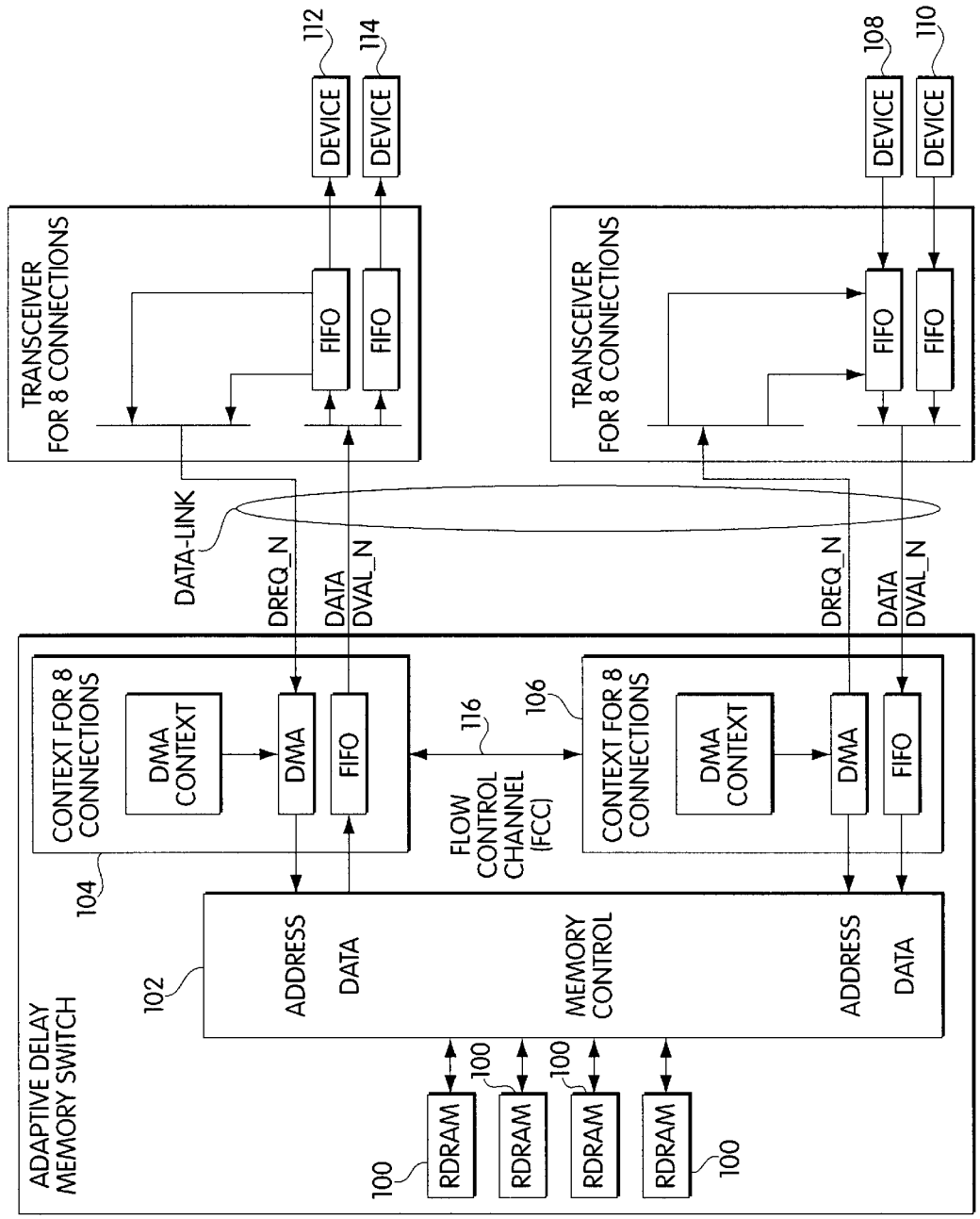
FIG. 7 is a block diagram of one embodiment of an adaptive delay memory switch.

In one embodiment, shown in FIG. 7, a fast memory is used as a multiport data switch with built in time-base correction and buffering. This embodiment allows multiple data stream copies to be created from a single input stream by allocating a separate buffer for each destination device. In FIG. 7, a memory 100 is accessed through a memory controller 102 by a first memory access engine 104 and a second memory access engine 106. Either device 108 or 110 write data into the memory 100 through DMA engine 106. Device 112 and device 114 read data from the memory 100 through DMA 104. DMA engine 106 maintains a context for devices 108 and 110. Similarly, DMA engine 104 maintains a context for devices 112 and 114. A flow control channel 116 is used between DMA engines 104 and 106, for each pair of contexts. In this embodiment, the devices implement switching by controlling the address into which data is written in the memory 100. Such techniques are described in more detail in U.S. Patent Application entitled "Method and Apparatus for Accessing Video Data in Memory Across Flow-Controlled Interconnection," filed Apr. 3, 1998, by Craig R. Frink, which is hereby incorporated by reference. A switch also may be connected between the devices 108, 110, 112 and 114 and the memory access engines 106 and 104.

A memory may be used as a switch into which packet data is assembled and disassembled for further processing. In a packet system, the memory in which such an operation occurs should be the destination specified for the packet in its header. If the packet indicates that the memory is not the final destination of the packet, the entire packet is treated as data. When the data is read from the memory, the header may be modified before sending the packet to the next destination. The unified memory 120 also may be implemented using host memory.

Figure 8:
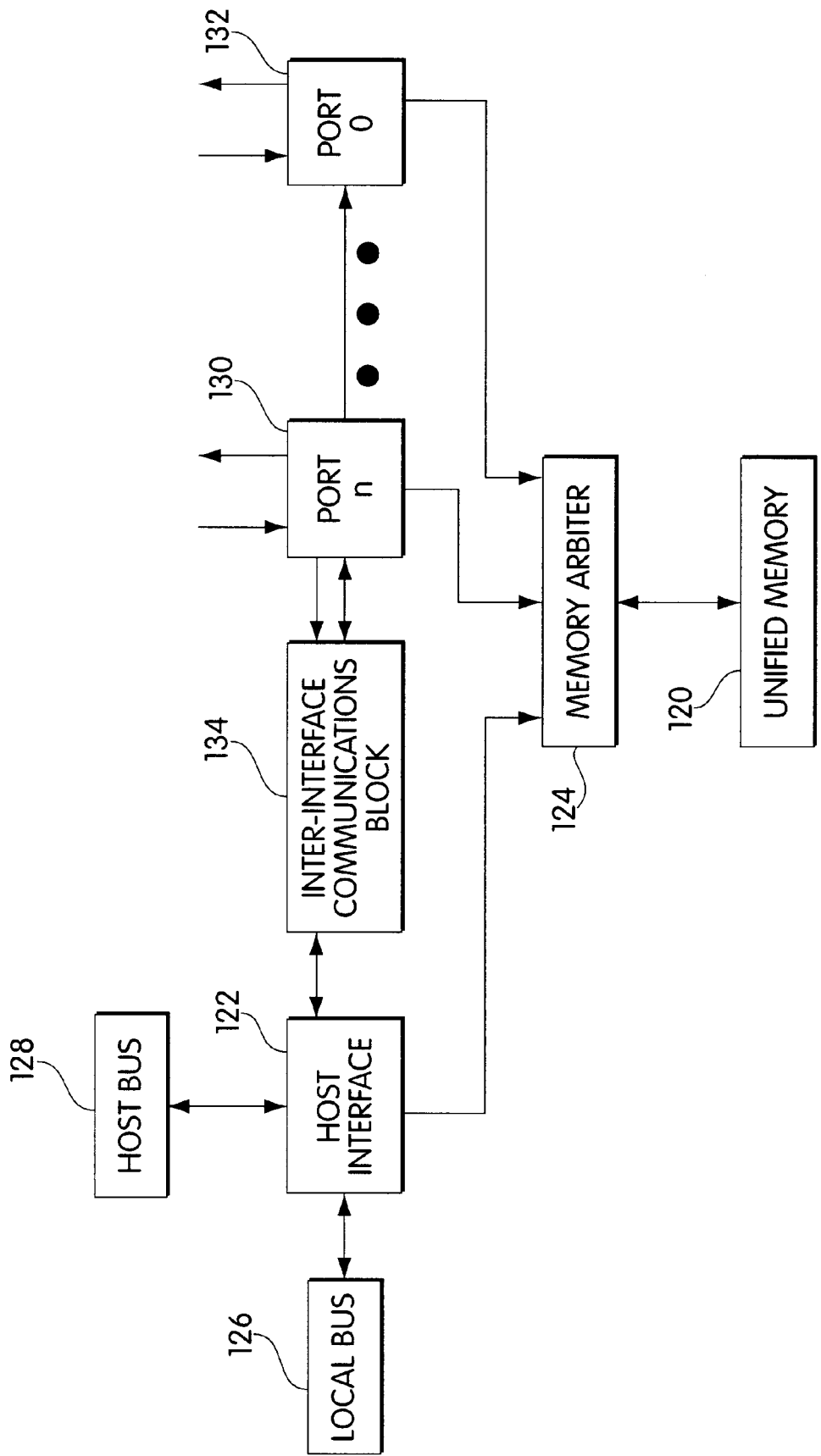
FIG. 8 is a block diagram of one embodiment using a memory subsystem as a switch.

Another embodiment shown in FIG. 8 for using a memory as a switch will now be described. In this embodiment, a large unified memory 120 is connected to a host interface 122 via a memory arbiter 124. The host interface 122 may connect the memory arbiter 124 to a local bus 126 and a host bus 128. Multiple ports for providing flow controlled data are shown at 130 and 132. The number of ports is limited by the available bandwidth to the memory 120. Some inter-interface communications may be provided at block 134.

Each port 130, 132 has two multi-context direct memory access (DMA) engines, one for reading and one for writing. The number of contexts supported equals the number of active stream identifiers for the port. A DMA engine includes data and address FIFOs for accessing the memory 120. Broadcast interrupt packets or signals may be used to convey status of one port 130 to other ports and interfaces via the inter-interface communications block 134. The host interface also may have two multicontext DMA engines with FIFO memories for reading and writing data to the memory in a similar connection to the inter-interface communications block 134. A host interface 122 may access the control and status registers in the memory subsystem. The local bus may be used to communicate with other subsystem components.

The inter-interface communications block 134 gathers broadcast interrupts and status signals from the interfaces and distributes them to the other devices connected to the memory. Passing of these signals corresponds to the flow controlled channel described above in connection with FIG. 6. The arbiter 124 selects one of the interfaces, whether the host interface 122 or ports 130 or 132.

Switches may support transport of both constant flow and controlled flow streams of data. Although data streams arrive at devices with no specified alignment, a constant flow data stream may require alignment. A constant flow stream also is switched at synchronization points, such as the vertical SYNC signal. In order to account for time-base delays between devices, and to ensure that these delays are compensated prior to creating a new connection, time-base correction may be used. A time-base corrector usually employs a frame buffer to store and synchronize the data. A controlled flow application may provide alignment using a small memory, such as a small first-in/first-out memory which stores a few components of video data.

By providing mechanisms that ensure that the flow of data to and from interconnected devices has completed prior to changing the switching configuration of the switch, multiple processing devices may be interconnected while simultaneously conveying flow control information between interconnected devices. The various methods for controlling the configuration of the switch enable circuit switches, packet switches and memory switches to be used and to be dynamically configured.

Having now described a few embodiments, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A switching system for dynamically configuring connections between devices which control flow of data between the devices, comprising:
    an input for receiving data and a plurality of outputs to which data received through the input is directed;
    a switch for directing data from the input to one of the plurality of outputs in response to command data;
    means for directing flow control information between the devices for controlling the flow of data between connected devices; and means for ensuring that flow of data between connected devices completes prior to changing connections between the devices by the switch;
    wherein the switch is a circuit switch, and,
    wherein the means for directing flow control information between the devices includes an input for receiving a request signal from a first device and for directing the request signal to a second device, and an input for receiving a valid data signal from the second device and for directing the valid data signal to the first device, and
    wherein the means for ensuring includes means for changing connections between the devices by the switch in response to a signal from the first device or the second device.

2. A switching system for dynamically configuring connections between devices which control flow of data between the devices, comprising:
    an input for receiving data and a plurality of outputs to which data received through the input is directed;
    a switch for directing data from the input to one of the plurality of outputs in response to command data;
    means for directing flow control information between the devices for controlling the flow of data between connected devices; and means for ensuring that flow of data between connected devices completes prior to changing connections between the devices by the switch;
    wherein the switch is a memory device,
    wherein the means for directing flow control information between the devices includes a first flow control channel connected between a first device and a second device, and a second flow control channel connected between the first device and a third device.

3. A switching system for dynamically configuring connections between devices which control the flow of data between the devices, comprising:
    a plurality of inputs for receiving data and an output to which data received through the inputs is directed;
    a switch for directing data from one of the inputs to the output in response to command data;
    means for directing flow control information between the devices for controlling the flow of data between connected devices; and means for ensuring that flow of data between interconnected devices completes prior to changing connections between the devices by the switch;
    wherein the switch is a circuit switch, and
    wherein the means for directing flow control information between the devices includes an input for receiving a request signal from a first device and for directing the request signal to a second device, and an input for receiving a valid data signal from the second device and for directing the valid data signal to the first device, and
    wherein the means for ensuring includes means for changing connections between the devices by the switch in response to a signal from the first device or the second device.

4. A switching system for dynamically configuring connections between devices which control the flow of data between the devices, comprising:
    a plurality of inputs for receiving data and an output to which data received through the inputs is directed;
    a switch for directing data from one of the inputs to the output in response to command data;
    means for directing flow control information between the devices for controlling the flow of data between connected devices; and means for ensuring that flow of data between interconnected devices completes prior to changing connections between the devices by the switch;

wherein the switch is a memory device,
wherein the means for directing flow control information between the devices includes a first flow control channel connected between a first device and a second device, and a second flow control channel connected between the first device and a third device.

* * * * *